5 Sheets—Sheet 1.

C. W. SIEMENS.
REGENERATIVE GAS FURNACES.

No. 190,915. Patented May 15, 1877.

Witnesses.  Inventor.

C. W. SIEMENS.
REGENERATIVE GAS FURNACES.

No. 190,915. Patented May 15, 1877.

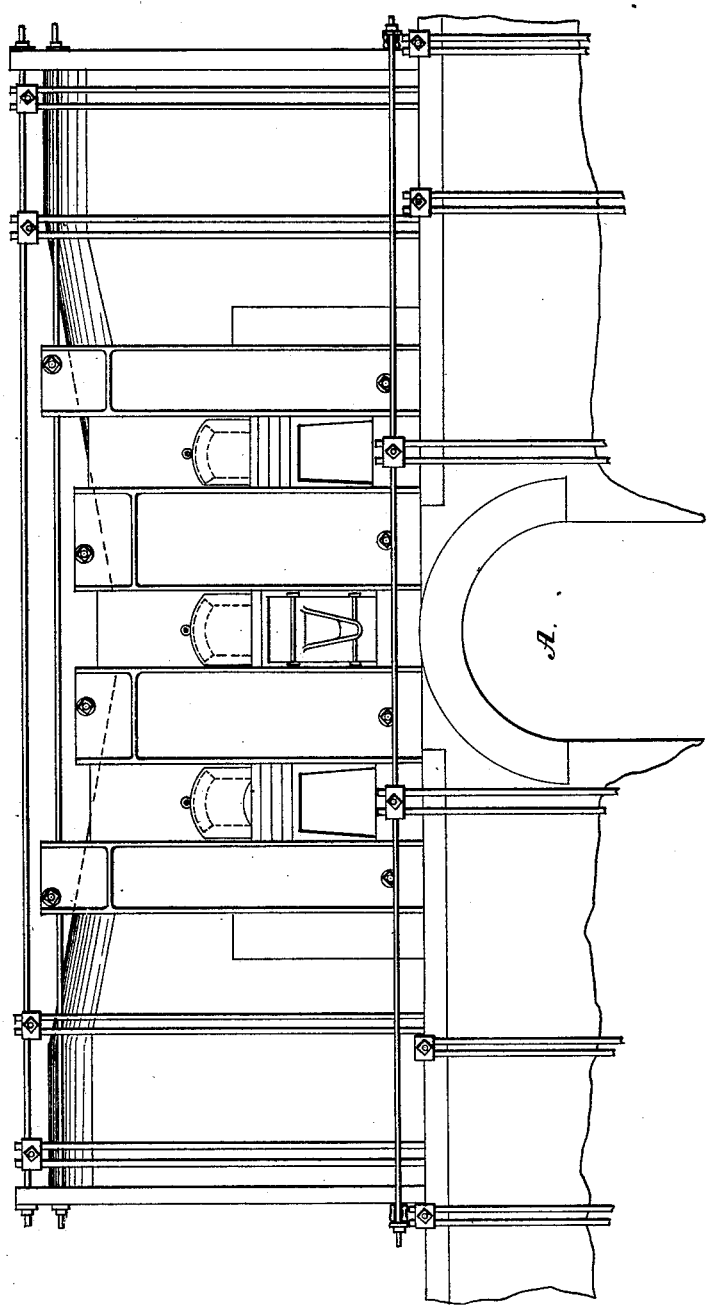

UNITED STATES PATENT OFFICE.

CHARLES WILLIAM SIEMENS, OF WESTMINSTER, ENGLAND.

IMPROVEMENT IN REGENERATIVE GAS-FURNACES.

Specification forming part of Letters Patent No. 190,915, dated May 15, 1877; application filed November 15, 1876.

*To all whom it may concern:*

Be it known that I, CHARLES WILLIAM SIEMENS, of Westminster, county of Middlesex, England, have invented certain Improvements in Regenerative Gas-Furnaces.

The following description, taken in connection with accompanying plate of drawings, hereinafter referred to, forms a full and exact specification, wherein are set forth the nature and principles of the invention, by which the same may be distinguished from others for which Letters Patent have heretofore been granted, together with such part thereof as I claim as new and desire to secure by Letters Patent of the United States.

My invention relates to that class of furnaces known as "regenerative gas-furnaces," for which Letters Patent of the United States were granted on the 1st day of March, 1864; and the nature thereof consists in certain improvements in the details of the construction of the same, hereinafter shown and described.

Figure 1:
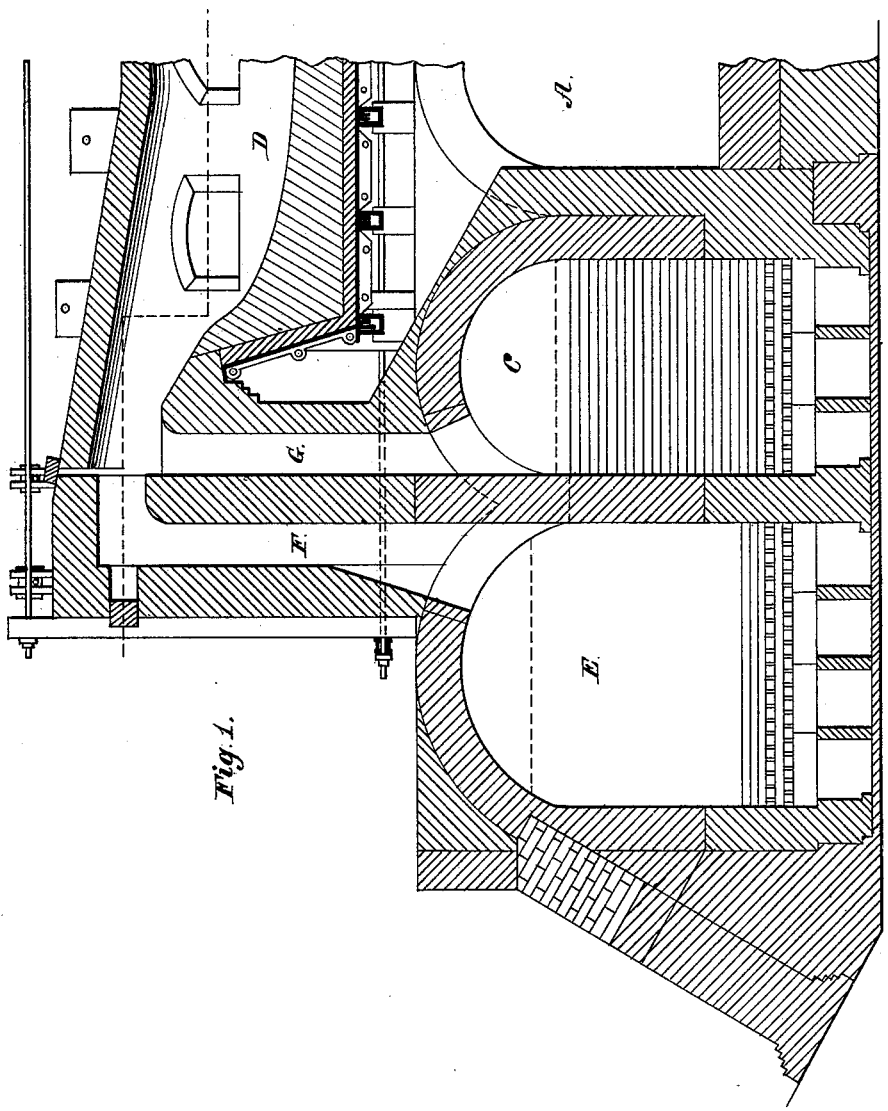
Figure 2:
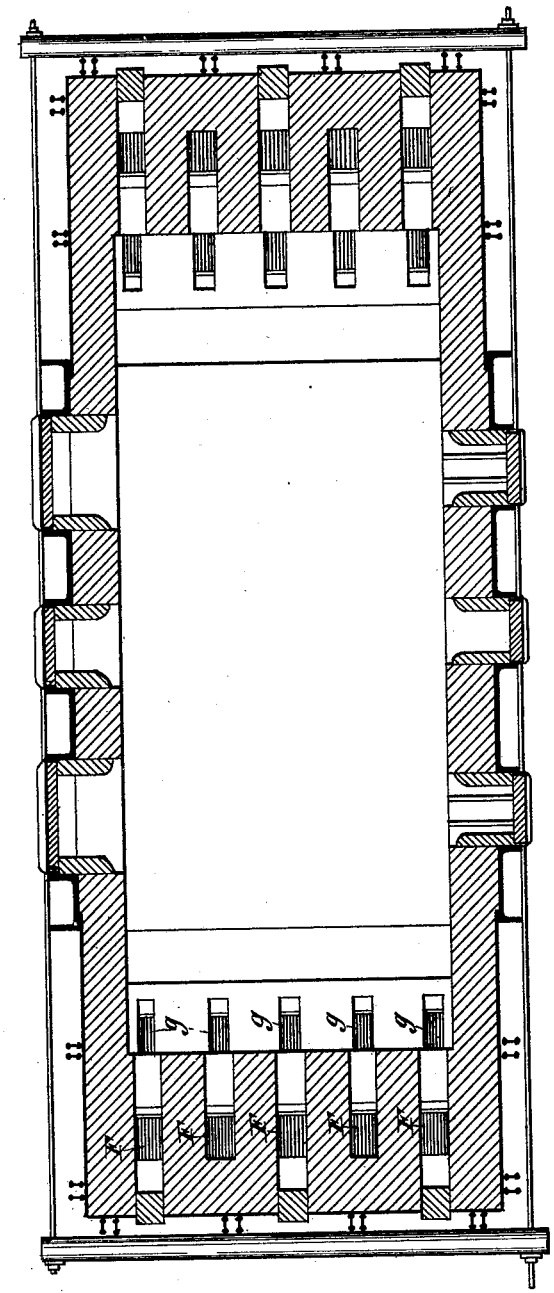
Figure 3:
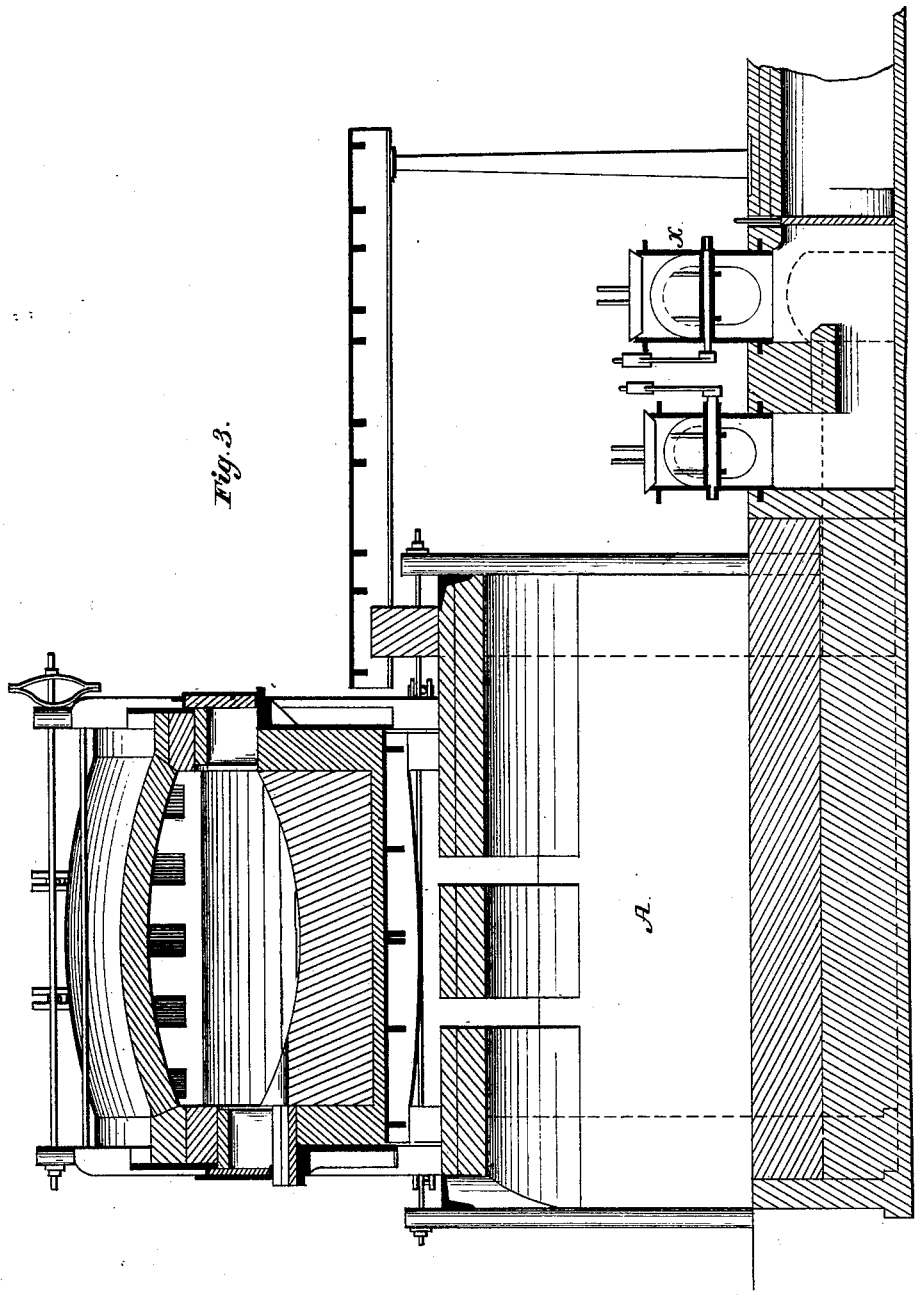
Figure 4:
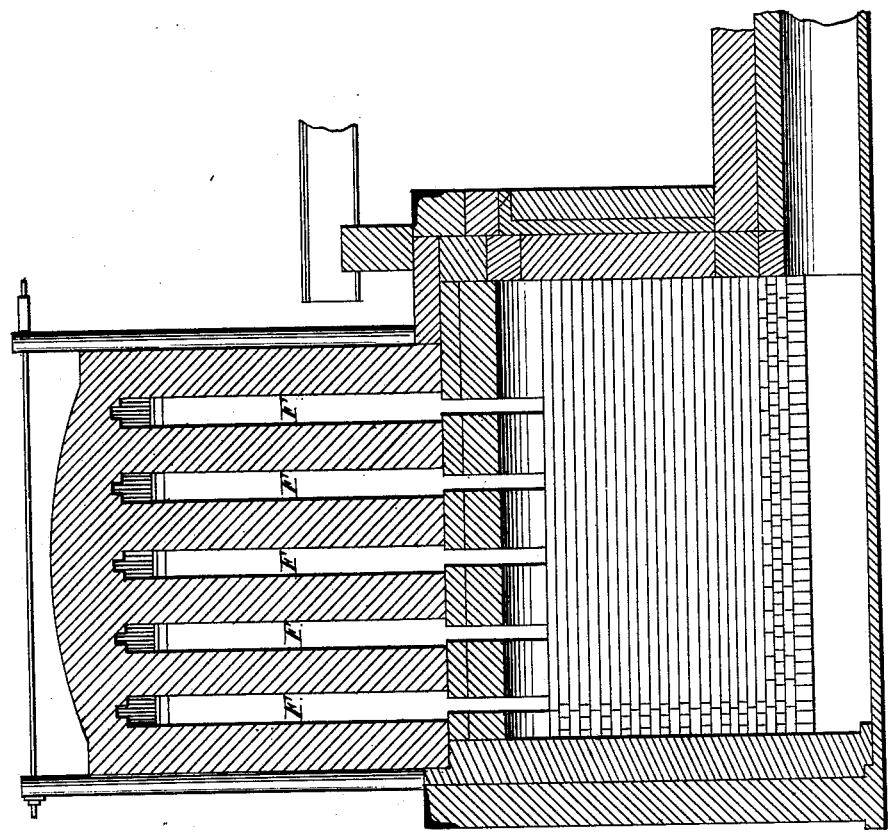

In the accompanying plate of drawings, in which corresponding parts are designated by similar letters, Figure 1 is a partial longitudinal vertical section of the furnace. Fig. 2 is a horizontal longitudinal section, showing the relative position of the air and gas flues. Fig. 3 is a transverse vertical section of the furnace through the cave A. Fig. 4 is a transverse vertical section through the air-flues. Fig. 5 is a longitudinal elevation.

The regenerative gas-furnace, as shown in the drawings, is built of fire-brick or other suitable refractory material, and consists of the four regenerators with the flues and valves, and the heating-chamber, where the metallurgical operations are carried on.

The four regenerators are arranged in pairs, and vary in size, the smaller being used for the passage of gas, and the larger for that of air, their proportions being in the ratio of two to three. Approximately, these ratios correspond to the quantities of gas and air required to insure complete combustion in the heating-chamber. The walls of the regenerators are built of fire-brick or other suitable refractory material, closely laid and whitewashed, or otherwise made gas-tight, so that no leakage may take place from one chamber to another. These chambers are filled with refractory material, by preference fire-brick, stacked loosely together, and each regenerative chamber has its own separate flue at the base, communicating with the valves by which the gas and air enter, or the products of combustion pass out, while from the top or side of each regenerative chamber a series of flues pass upward and communicate with the heating-chamber; and I prefer to cause the air to enter the heating-chamber above the gas, as by its superior specific gravity at equal temperatures it tends to sink through the gas, and thus an intimate mixture and more perfect combustion is obtained. The entering or issuing gaseous currents pass through valves, which are shown at $x$ in Fig. 3.

The heating-chamber, where the metallurgical processes are carried on, has its roof and sides constructed of highly refractory materials, such as best silica or Dynas bricks. The bed is usually made of sand.

Below the center of the furnace is an open cave, A, through which air freely circulates, and rises through openings into the air-space below the melting-chamber and behind the bridges, whereby a perfect cooling of the sides of the melting-chamber is effected. This cave serves, moreover, as a receptacle for any metal which may break through the sides or bottom of the melting-chamber, whence it can be removed at leisure, without, meanwhile, encumbering the ventilating-spaces around the melting-chamber.

On first lighting the furnace, the gas passes through the proper valves and flues into the bottom of regenerator-chamber $c$, while the air enters through corresponding valves and flues into the regenerator-chamber E, which should be about one-half larger than the gas-regenerator chamber $c$. The currents of gas and air, both quite cold, rise separately through the regenerators $c$ and E, and pass up through the series of flues G G G G G and F F F F F, respectively, into the furnace above, where they meet and are lighted, burning and producing a moderate heat. Each air-port rises from its regenerator behind the corresponding gas-port, and is projected into the furnace over such gas-port, it being important that the air-port should overlap the gas-port on both sides. Great solidity of brick-work and perfect combustion is thereby attained.

The products of combustion pass away through a similar set of flues at the other end of the furnace into the regenerator-chambers $c'$ $E'$, which are not shown in the drawings, but are symmetrical, both in construction and arrangement, with the chambers $c$ $E$, already described. The products pass from thence, through properly-constructed flues and valves, to the chimney-flue. The waste heat is thus deposited in the upper courses of open fire-brick work, filling the chambers $c'$ $E'$, and heats them up, while the lower portion and the chimney-flues are quite cool; then, after a suitable interval, the reversing-flaps—through which the air and gas are admitted or withdrawn from the furnace—are reversed, and the air and gas enter through those regenerator-chambers $E'$ $c'$ which have been just heated by the waste products of combustion, and in passing up through the checker-work they become heated, and then, on meeting and entering into combustion in the furnace D, they produce a very high temperature, the waste heat from such higher temperature of combustion heating up the previously cold regenerators $c$ $E$ to a corresponding higher heat. Thus an accumulation of heat and an accession of temperature is obtained step by step, so to speak, until the furnace is as hot as required. The heat is, at the same time, so thoroughly abstracted from the products of combustion by the regenerators that the chimney-flue remains comparatively cool.

The command of the temperature of the furnace, and of the quality of the flame, is rendered complete by means of gas and air regulating valves, and by the chimney-damper.

Having thus described my invention, I claim and desire to secure by Letters Patent of the United States—

1. A regenerative furnace in which a series of air-flues are arranged behind a series of gas-flues, each air-flue overlapping the gas-flue in front thereof, as and for the purposes described.

2. A regenerative furnace in which a series of air-flues rise from their regenerator behind, and discharge into the furnace above, a corresponding series of gas-flues, the top of each air-flue being wider than the gas-flue in front thereof, as and for the purposes described.

3. A system of regenerative chambers arranged beneath the furnace-hearth, and having a central cave or tunnel communicating with the hearth-bottom, through which air-currents may circulate, as and for the purposes described.

In testimony that I claim the foregoing I have hereunto set my hand this 8th day of November, 1876.

C. WILLIAM SIEMENS.

Witnesses:
J. THORPE POTTS,
EDWARD C. INGERSOLL.